United States Patent [19]

Hakamada et al.

[11] Patent Number: 4,667,209

[45] Date of Patent: May 19, 1987

[54] IMAGE RECORDING APPARATUS

[75] Inventors: Isao Hakamada; Kazuhiko Matsuoka, both of Yokohama, Japan

[73] Assignee: Canon Kabushiki Kaisha, Tokyo, Japan

[21] Appl. No.: 807,115

[22] Filed: Dec. 10, 1985

Related U.S. Application Data

[63] Continuation of Ser. No. 511,181, Jul. 6, 1983, abandoned.

[30] Foreign Application Priority Data

Jul. 9, 1982 [JP] Japan .................................. 57-120311

[51] Int. Cl.[4] .......................... G01D 15/06; H04N 1/23
[52] U.S. Cl. .................................. 346/160; 346/155; 358/300
[58] Field of Search ........................... 357/17; 369/122

[56] References Cited

U.S. PATENT DOCUMENTS

| 2,540,922 | 2/1951 | Wickham | 346/108 |
| 3,783,185 | 1/1974 | Spaulding | 346/108 |
| 3,800,302 | 3/1974 | Carreira | 346/160 |
| 4,375,067 | 2/1983 | Kitamura | 346/160 |
| 4,450,453 | 5/1984 | Kitamura et al. | 346/108 |

OTHER PUBLICATIONS

Zachos, Thomas H. et al, "Resonant Mode of GaAs Junction Lasers", *Semiconductor Injection Lasers*, IEEE Press: New York, 1980, pp. 63–71.

Primary Examiner—E. A. Goldberg
Assistant Examiner—Linda M. Peco
Attorney, Agent, or Firm—Fitzpatrick, Cella, Harper & Scinto

[57] ABSTRACT

In an image recording apparatus for recording images by modulating a light beam by information signals and applying the light beam to a recording medium, the longitudinal mode of the light beam is multiple, that is, comprises a plurality of oscillation wavelengths.

1 Claim, 6 Drawing Figures

IMAGE RECORDING APPARATUS

This application is a continuation of application Ser. No. 511,181 filed July 6, 1983, now abandoned.

BACKGROUND OF THE INVENTION

1. Field of the Invention

This invention relates to an image recording apparatus for recording images on a recording medium by a light beam.

2. Description of the Prior Art

Various image recording apparatuses utilizing a light beam are known. For example, as a photosensitive medium of an electrophotographic recording apparatus using a laser as a light source, use has been made of selenium, a selenium type alloy, a cadmium sulfide resin dispersion system, a charge transfer complex of polyvinyl carbazole and trinitrofluorenone, or the like. Also, as the laser, use has been made of a gas laser such as helium-cadmium, argon, helium-neon or the like and further, compact low-cost semiconductor lasers which can be directly modulated have come to be used. The spectrum of such semiconductor lasers is a coherent one of very high monochromaticity as shown, for example, in FIG. 1 of the accompanying drawings.

As regards the photosensitive medium, attention has been paid to a multi-layer type photosensitive medium comprising a charge transfer layer and a charge producing layer so that a sufficient sensitivity and charging characteristic may be obtained in accordance with the wavelength of the laser light used. As compared with a photosensitive medium using a single photoconductive layer, in the multi-layer type photosensitive medium, photosensitivity can be caused to depend only on the charge producing layer and therefore, photoconductive materials having photosensitivity to the wavelength of the laser light used can be relatively freely chosen.

The charge producing layer of the multi-layer type photosensitive medium has the function of absorbing light and producing charges, and the thickness thereof is usually as thin as 0.1 to 5 $\mu$m. The charge transfer layer has the function of receiving electrostatic charges and transporting charges, and a material hardly absorbing image forming light is used for such layer and the thickness thereof is usually 5 to 30 $\mu$m.

Now, when an image is formed by the use of such multi-layer type photosensitive medium and by line-scanning a laser light by a laser beam printer, there is no problem in forming line images such as characters, but in the case of a solid image, a density irregularity of interference fringe appears.

The reason for this is considered to lie in the interference between the reflected light on the surface of the charge transfer layer and the reflected light on the surface of a substrate such as a metal. That is, the multi-layer type electrophotographic photosensitive medium is of a construction in which, as shown in FIG. 2 of the accompanying drawings, a charge producing layer 2 and a charge transfer layer 3 are laminated on a substrate 1. When a laser light 4 (whose light emission wavelength is about 0.8 $\mu$m for a semiconductor laser and about 0.63 $\mu$m for a helium-neon laser) is incident on such multi-layer type photosensitive medium, there occurs interference between a reflected light 5 on the surface of the charge transfer layer 3 of a great reflection factor and a light 6 reflected by the surface of the substrate 1 and coming out of the surface of the charge transfer layer 3, as shown in FIG. 3 of the accompanying drawings. If the refractive index of the charge producing layer 2 and the charge transfer layer 3 is n and the thickness thereof is $d_1$ and the wavelength of the laser light is $\lambda$, when $nd_1$ is a multiple as great as $\lambda/2$, the intensity of the reflected light is maximum, that is, the intensity of the light coming into the interior of the charge transfer layer 3 is minimum (due to the law of conservation of energy), and when $nd_1$ is an odd number multiple as great as $\lambda/4$, the reflected light is minimum, that is, the light coming into the interior is maximum. Now, location irregularity of the order of 1 $\mu$m is unavoidable for $d_1$. Laser light is of good monochromaticity and coherent and therefore, the aforementioned interference condition changes correspondingly to the location irregularity of $d_1$ and thus, location irregularity of the amount of absorption of the laser light in the charge producing layer 2 occurs. This factor is considered to appear as the interference-fringe-like irregularity of density of the solid image.

The density irregularity due to such interference fringe is remarkable, particulary when a multi-layer type photosensitive medium is used as described above, and also in other recording media, the density irregularity as mentioned above may sometimes occur depending on the structure thereof.

SUMMARY OF THE INVENTION

It is an object of the present invention to provide an image recording apparatus which is capable of accomplishing image recording free of the density irregularity due to interference fringe.

The present invention achieves the above object, in an image recording apparatus wherein a light beam is modulated by information signals and the light beam is applied to a recording medium to thereby record images, by using as the light beam a light beam whose longitudinal mode is multiple, that is, which produces a plurality of oscillation wavelengths.

The invention will become fully apparent from the following detailed description thereof taken in conjunction with the accompanying drawings.

DESCRIPTION OF THE PREFERRED EMBODIMENT

Figure 2:
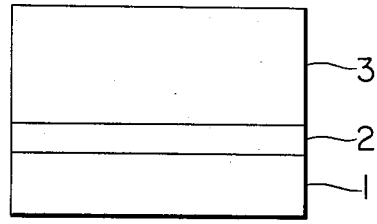
FIG. 2 is a schematic cross-sectional view showing the construction of a multi-layer type photosensitive medium according to the prior art.
Figure 3:
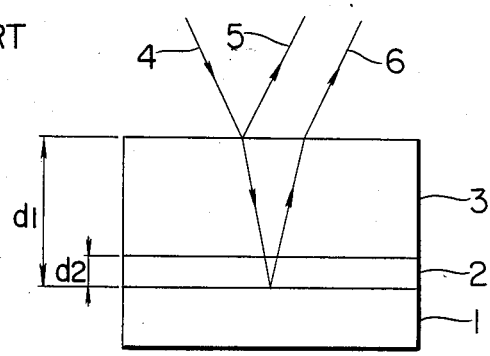
FIG. 3 illustrates the interference of the light beam in the photosensitive medium of FIG. 1.
Figure 4:
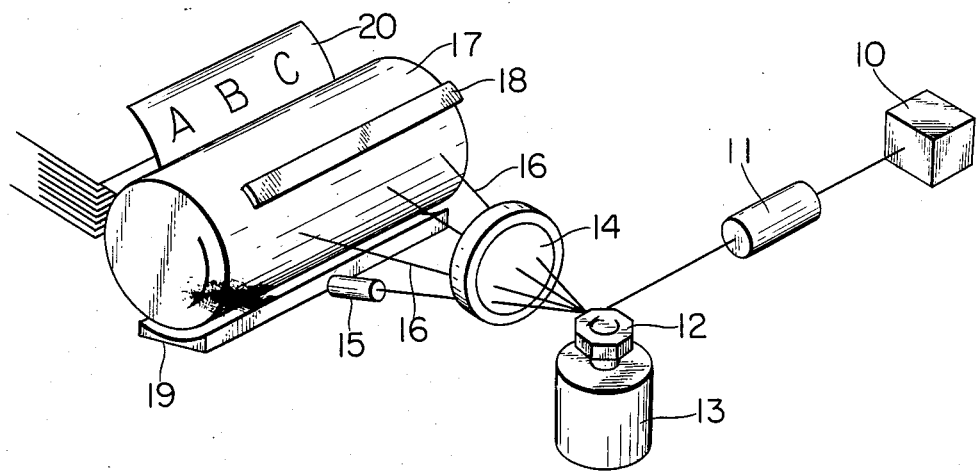
FIG. 4 is a perspective view showing the construction of an embodiment of the image recording apparatus of the present invention.

FIG. 4 is a perspective view schematically showing the construction of an embodiment of an image recording apparatus to which the present invention is applied. Designated by 10 is a light beam generating unit for generating a light beam. The longitudinal mode of the light beam emitted from the light beam generating unit 10 is multiple, that is, comprises a plurality of oscillation wavelengths. In the present embodiment, the light beam generating unit 10 comprises a semiconductor laser. Reference numeral 11 designates a collimater lens for collimating the light beam emitted from the light beam generating unit 10, and reference numeral 12 denotes a rotatable polygonal mirror having a plurality of mirror surfaces. The rotatable polygonal mirror 12 deflects the light beam collimated by the collimater lens 11. Reference numeral 13 designates a motor for rotating the rotatable polygonal mirror 12 at a constant speed, reference numeral 14 denotes an f-θ lens for causing the light beam swept by the rotatable polygonal mirror 12 to be imaged in the form of a spot on a photosensitive drum 17, and reference numeral 15 designates a beam detector comprising a small incidence slit and a quickly responsive photoelectric conversion element. The beam detector 15 detects the scanning start position of the swept light beam 16 and determines, by the detection signal, the start timing of a modulation control signal for modulation control for imparting desired light information to the photosensitive drum 17. The photosensitive medium 17 is of a multi-layer construction comprising an organic photoconductor (OPC) as shown in FIGS. 2 and 3. Reference numeral 18 designates a charger for uniformly charging the surface of the photosensitive medium 17 to the positive or the negative polarity, reference numeral 19 denotes a developing device for visualizing an electrostatic latent image formed on the photosensitive medium 17, and reference numeral 20 designates a sheet to which the image developed by the developing device 19 is transferred.

The semiconductor laser 10 is current-modulated in accordance with image information and emits a light beam. This light beam is collimated by the collimater lens 11 and is incident on the rotatable polygonal mirror 12 rotated at a constant speed. The light beam is swept by the rotatable polygonal mirror 12 and is applied onto the photosensitive drum 17 by the f-θ lens 14. The photosensitive drum 17 is charged to the positive or the negative polarity by the charger 18, and an electrostatic latent image is formed on the photosensitive drum 17 in accordance with the light beam applied thereto. The electrostatic latent image is developed by the developing device with the aid of a developer consisting chiefly of charged toner particles, whereafter the developed image is transferred to the sheet 20 by transfer means, not shown, and the transferred image is fixed by fixing means, not shown, whereby there is obtained a printed image.

Figure 5:
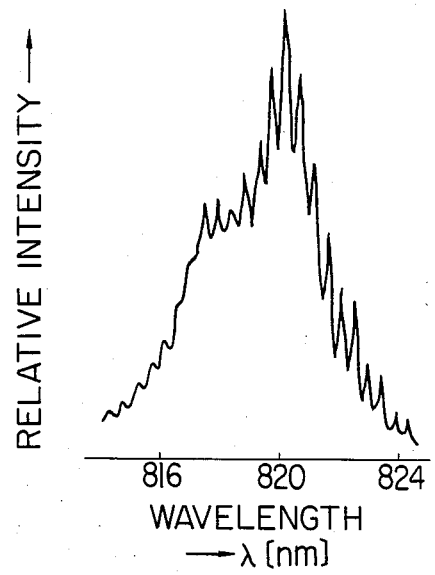
FIG. 5 shows the spectrum of a semiconductor laser applicable to the present invention.

FIG. 5 shows the spectrum, of a multi-mode oscillation semiconductor laser having a central oscillation wavelength 820 nm which is an embodiment of the light beam generating unit shown in FIG. 4.

Figure 1:
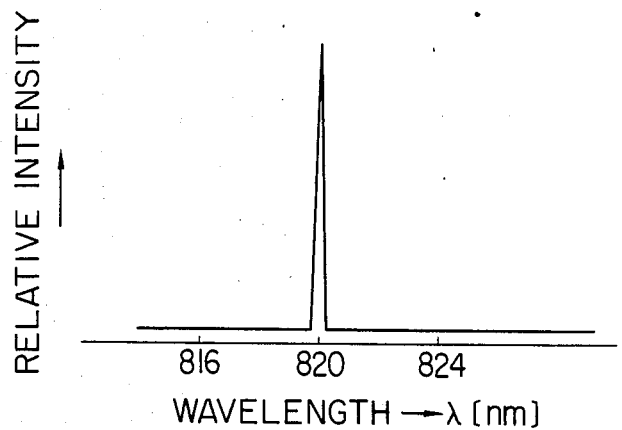
FIG. 1 shows the spectrum of a semiconductor laser which is used in the apparatus of the prior art and whose longitudinal mode is single.

In the present embodiment, as compared with the conventional case where use is made of a semiconductor laser having the wavelength characteristic as shown in FIG. 1, a semiconductor laser is used in which the longitudinal mode is multiple as described above, that is, that produces a plurality of oscilltion wavelengths as shown in FIG. 5, whereby the density irregularity in the form of an interference fringe could be greatly reduced to such a degree that there is no problem in practical use. The interference appears due to its coinciding with the interference condition corresponding to the oscillation wavelength and therefore, by using a light beam whose longitudinal mode is multiple, the interference can be dispersed and thus, the interference fringe can be eliminated.

In the present embodiment, the degree of multiplicity of the longitudinal mode has been small, but as the degree of multiplicity of the longitudinal mode of the semiconductor laser is increased, the effect thereof is greater and therefore, it is desirable that the number of modes and the wavelength width resulting therefrom be great.

Figure 6:
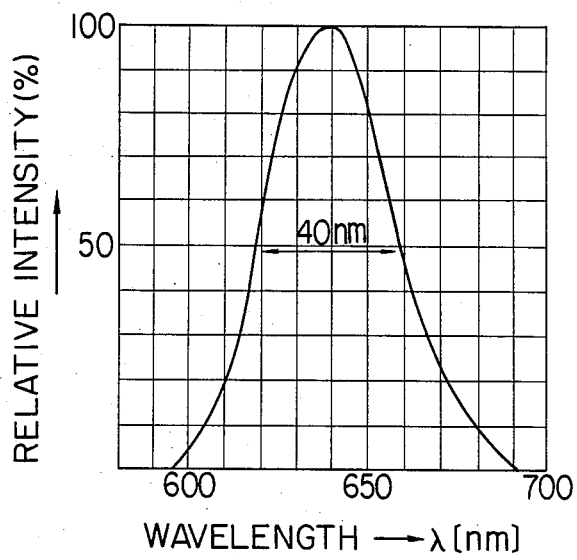
FIG. 6 shows the spectrum of a light emitting diode (LED) applicable to the present invention.

FIG. 6 shows the spectrum of a GaAlAs light emitting diode (LED) which may be used as the light beam generating unit in the present invention.

Due to the use of the LED, the size of the imaged spot and the recording speed have not been the same as those in the previously described embodiment, but the range of wavelengths widths is about 100 nm and the half-width is about 40 nm and the interference fringe is of such a degree that there is no problem in practical use. As the range of wavelength widths is wider, the density irregularity resulting from the interference fringe is more reduced.

According to the present invention, as described above, image recording is effected by a light beam whose longitudinal mode is multiple and therefore, the influence of interference fringe can be reduced and thus, it becomes possible to accomplish image recording free of density irregularity.

We claim:

1. An image recording apparatus comprising:
a multi-layer type photosensitive medium; and
means for recording images by scanning said photosensitive medium with a laser beam, said means including a semiconductor laser which produces multimode oscillations, said laser beam being a light which comprises a plurality of different wavelengths and the distance between the upper and lower wavelength of which is no less than 8 nm, said laser beam being modulated by a single information signal.

* * * * *

UNITED STATES PATENT AND TRADEMARK OFFICE
CERTIFICATE OF CORRECTION

PATENT NO. : 4,667,209

DATED : May 19, 1987

INVENTOR(S) : ISAO HAKAMADA, ET AL.

Page 1 of 2

It is certified that error appears in the above-identified patent and that said Letters Patent is hereby corrected as shown below:

AT [56] OTHER PUBLICATIONS

"Mode" should read --Modes--.

COLUMN 2

Line 2, "of the" should read --of both the--.
    Line 22, "particulary" should read --particularly--.
    Line 58, "light emitting" should read
        --light-emitting--.

COLUMN 3

Line 4, "collimater" should read --collimator--.
    Line 9, "collimater" should read --collimator--.
    Line 37, "collimater" should read --collimator--.
    Line 54, "spectrum, of" should read --spectrum of--.

UNITED STATES PATENT AND TRADEMARK OFFICE
CERTIFICATE OF CORRECTION

PATENT NO. : 4,667,209　　　　　　　　　　　　Page 2 of 2.

DATED : May 19, 1987

INVENTOR(S) : ISAO HAKAMADA, ET AL.

It is certified that error appears in the above-identified patent and that said Letters Patent is hereby corrected as shown below:

COLUMN 4

Line 8, "oscilltion" should read --oscillation--.
Line 23, "width" should read --widths--.
Line 25, "light emit-" should read --light-emit- --.
Line 31, "wavelengths" should read --wavelength--.
Line 32, "40 nm and the" should read --40 nm. The--.

Signed and Sealed this

First Day of September, 1987

Attest:

DONALD J. QUIGG

Attesting Officer　　　　　Commissioner of Patents and Trademarks